United States Patent
Ohnesorge et al.

(10) Patent No.: US 9,129,719 B2
(45) Date of Patent: Sep. 8, 2015

(54) IONS METERING DEVICE FOR AN ENERGY STORAGE DEVICE, METHOD OF MANUFACTURING A METERING DEVICE AND ION ENERGY STORAGE DEVICE

(71) Applicant: Airbus Defence and Space GmbH, Ottobrunn (DE)

(72) Inventors: Alexander Ohnesorge, Brunnthal (DE); Michael Pilawa, Munich (DE); Juergen Steinwandel, Uhldingen-Muehlhofen (DE); Michael Hofmann, Neubiberg (DE); Alexander Kaiser, Wellendingen (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/456,584

(22) Filed: Aug. 11, 2014

(65) Prior Publication Data

US 2015/0060689 A1 Mar. 5, 2015

(30) Foreign Application Priority Data

Aug. 12, 2013 (DE) .......................... 10 2013 013 295

(51) Int. Cl.
*G21K 5/04* (2006.01)
*G21K 1/08* (2006.01)
*H01M 6/36* (2006.01)

(52) U.S. Cl.
CPC .. *G21K 1/08* (2013.01); *H01M 6/36* (2013.01)

(58) Field of Classification Search
USPC ............. 250/396 R, 397, 282, 281, 283, 288; 315/500–505; 427/58, 122, 123; 429/156, 210, 300, 303, 306, 307, 310, 429/311, 336, 338, 321–323

See application file for complete search history.

(56) References Cited

U.S. PATENT DOCUMENTS

| | | | |
|---|---|---|---|
| 6,326,105 B1 * | 12/2001 | Kejha et al. | 429/303 |
| 7,459,228 B2 * | 12/2008 | Aoto | 429/458 |
| 7,655,360 B2 | 2/2010 | Hennige et al. | |
| 2005/0201715 A1 | 9/2005 | Ellwood | |
| 2012/0088134 A1 | 4/2012 | Wood et al. | |
| 2012/0237816 A1 * | 9/2012 | Roscheisen et al. | 429/156 |
| 2013/0004857 A1 | 1/2013 | Kia et al. | |

FOREIGN PATENT DOCUMENTS

| | | |
|---|---|---|
| DE | 198 24 666 B4 | 8/2008 |
| DE | 10 2012 211 304 A1 | 1/2013 |
| EP | 0 291 459 A2 | 11/1988 |
| GB | 23265 A | 3/1912 |
| WO | WO 90/02327 A1 | 3/1990 |

OTHER PUBLICATIONS

German Office Action dated Jun. 13, 2014 (eight pages).
German-language European Search Report dated Dec. 1, 2014 with partial English translation (ten (10) pages).

* cited by examiner

*Primary Examiner* — Nicole Ippolito
(74) *Attorney, Agent, or Firm* — Crowell & Moring LLP

(57) ABSTRACT

An ion dosage apparatus for an energy storage apparatus includes a first energy guiding device with a first energy supply device and a separating device. The separating device is configured to control, via supplied energy, a number of ions that are transported around the first energy guiding device and/or blocked.

15 Claims, 2 Drawing Sheets

IONS METERING DEVICE FOR AN ENERGY STORAGE DEVICE, METHOD OF MANUFACTURING A METERING DEVICE AND ION ENERGY STORAGE DEVICE

FIELD OF THE INVENTION

The present invention concerns the technical field of energy storage devices, and more specifically an ion dosage apparatus for an energy storage device, a method for manufacturing an ion dosage device for an energy storage device and an energy storage device.

BACKGROUND OF THE INVENTION

Batteries or accumulators comprise a self-discharge that results in such battery having only a limited storage life. With currently available commercial cells, self-discharge may be at 1% of cell capacity per month, for example. Because of the high self-discharge, such batteries cannot be employed or employed to only limited extent in cases in which the batteries prior to their use must be stored for a long period of time, with the batteries undergoing further conditioning during storage. High self-discharge thus renders more difficult storage of 10 years and longer.

Thermal batteries exist which, however, only permit brief operation on the order of a few minutes.

European patent document EP 0 291 459 A2 describes a method for reductive manipulation of optical bodies from cross-linked polymers.

PCT patent document WO 90/02327 describes measures for influencing sensitivity and selectivity of ion-channel membrane bio-sensors.

SUMMARY OF INVENTION

Exemplary embodiments of the invention facilitate improved and secure storage of energy by providing an ion dosage apparatus for an energy storage device, a method for manufacturing, and an energy storage device.

An energy storage apparatus can not only be used for storage of energy. After activation of the energy storage apparatus, it releases the energy stored therein and can be used as energy supply device or a generator, for instance in order to operate as a circuit. Activation can shift components of the energy storage apparatus into an electrically conductive state and/or an ionic conductive state, such as for example an ion dosage apparatus or the separation device contained in the ion dosage apparatus.

According to one aspect of the present invention, an ion dosage apparatus is described for an energy storage apparatus. The ion dosage apparatus comprises a first energy guiding device with a first energy supply device and a separation device. A first energy can be supplied to the first energy guiding device via the first energy supply device.

The separation device is set up in a first status of the ion dosage apparatus so that no energy is supplied via the first energy supply device, to block ions that would be transported past the first energy guiding device. In one example, the ion dosage apparatus comprises an energy guiding device and a separation device or a barrier device, for example a barrier layer which, in essence only permits a charging carrier transport if the separation device has been destroyed or its ion guiding capability ceased.

The first energy guiding device is set up to specify the transport direction of the first energy, in order to conduct the first energy to a position of the separation device, which, in essence, can be specified within the ion dosage apparatus, and to transfer at the position the first energy to the separation device within the ion dosage apparatus. In one example, the energy guiding device transmits the energy over the entire length of the energy guiding device. In another example, it is possible to achieve the energy transfer at a certain place by means of an uncoupling device, for example via structuring of gradients of a gradient light guiding fiber.

In a second status of the ion dosage apparatus, in which the first energy is supplied via the first energy supply device, the volume or size of the supplied first energy determines the number of ions transported by the separation device past the first energy guiding device (102a, 103a, 104a, 105a, 106a) and/or the number of ions permitted to pass by the separation device. Thus, the volume of the transmitted first energy determines the ion flow density via the separation device, in particular the ion flow density past the first energy guiding device or around the first energy guiding device. The energy supplied from one energy source indirectly controls the volume of the transferred energy and thus the number of transported and/or ions permitted to pass.

At the specifiable position of the ion dosage apparatus, to which the first energy is conducted, the major portion of the transported energy essentially acts upon the separation device. The separation device can be selected in keeping with the employed form of energy, so that the energy released by the energy guiding device either works together with, alternates with or is absorbed by the separation device. The interaction or absorption of the energy can have an effect in the separation device leading to the change in the transport capability for ions. The selection of the separation device, in particular the selection of the material of the separation device can thus depend upon the employed energy form for the first energy. The separation device or the barrier layer is hereby selected in such manner that, in essence, the entire energy provided via the energy guiding device can be absorbed. If, for example, by way of first energy an optical energy is selected in form of a laser radiation, then a photo-chemically decomposable polymer is used as a separation device within the ion dosage apparatus. In a further example, the photo-chemically decomposable polymer is adjusted to a certain wavelength of the laser radiation, so that maximum decomposition occurs with defined wavelength.

The energy can be transferred over the entire length of the energy guiding device. By means of special measures, such as providing a casing, it is possible to undercut energy transfer at given locations where transfer of energy is not desired. Also, transfer of energy can be promoted by means of appropriate modifications of the energy guiding device, such as providing structuring. In one example, structures are introduced into a gradient light guiding fiber, which, at certain locations, cause a partial uncoupling of the radiation. By such modification, it is possible to determine the location at which the first energy is transferred to the separation device.

The separation device may be set up so as to control a number of ions that are transported around or blocked by the first energy guiding device by means of the supplied energy.

The term "to transport around" can also be understood that ions are transported past the energy guiding device, in particular that the ions are transported through spaces that are formed by the energy guiding device or a multitude of energy guiding devices.

According to another aspect of the present invention, a method is described for manufacturing an ion dosage apparatus for an energy storage apparatus. The method comprises providing a first energy guiding device and a first energy supply device, whereby the first energy supply device may be arranged at the first energy guiding device. The first energy guiding device can be supplied with first energy via the first energy supply device. Thus, the first energy supply device can facilitate coupling a first energy into the first energy guiding device, for example, effect coupling from an energy source.

The supplied first energy guiding device is surrounded by a separation device, by means of which transport of ions can be prevented or, however, the first energy guiding device is embedded into the forenamed separation device. The energy supply device in combination with the energy guiding device and the separation device form the ion dosage device. In one example, the energy guiding device is shifted in such manner to a plane that as a result of the shifting mode, openings are created between the energy guiding device. These openings can be created, for example, by a multitude of first energy guiding devices by parallel or lattice-shaped arrangement of at least two energy guiding devices and/or by loop-shaped placement of one single first energy guiding device. The openings, which exist in spaces of the first energy guiding device, are locked with the separation device within the ion dosage device. The ion dosage apparatus or its separation device can be used as separation medium or barrier layer for an ion transport device, for example for an electrolyte within a battery. The electrolyte may be used together with a separator. The ion dosage apparatus or its separation device, due to its separation effect, is able to essentially block an ion transport, in particular if there is no interaction of the ion dosage apparatus and/or the separation device with the ion transport device. In one example, a number of ions, which can be specified, can be conducted around the energy guiding device or past the energy guiding device. The number of ions, which are transported inside the ion dosage apparatus, is determined by energy volume or the form of supplied energy provided by the energy guiding device to the separation device. For conducting of ions, the ion dosage apparatus can receive ions from an ion transport device or be part of the ion transport device. For guidance of ions, an ion channel may be used in one example.

Encapsulating the first energy guiding device inside the ion dosage apparatus with separation device takes place in a manner that the separation device is set up, in a first status, in which no energy is supplied via the first energy supply device, by blocking ions, which would be transported past the first energy guiding device, or by dosage of number of mobile ions in the separation device. For capability of transporting the first energy, the first energy supply device is joined with the first energy guiding device. The first energy guiding device is set up to specify the transport direction of the first energy, so as to conduct the first energy to a location of the separation device that can be specified, within the ion dosage apparatus and to provide, at the location, the separation device with first energy.

In addition, surrounding the first guiding device with the separation device takes place in such manner that in a second status, in which the first energy is conducted via the first energy supply device, the volume of the emitted first energy determines the number of ions transported by the separation device past the first energy guiding device and/or the number of ions permitted to pass by the separation device.

By changing between the first status and the second status and vice versa, the ion dosage apparatus can be switched from a blocked status to a conductive status. The first status could correspond to a dormant or storage status. The second status could correspond to an activated status.

According to another aspect of the present invention, a description is given of an energy storage apparatus, for example a battery or an accumulator. The energy storage apparatus comprises a first electrode, a second electrode and an ion transport device as well as the invention-specific ion dosage apparatus. The ion dosage apparatus is in contact with the ion transport device in order to control a number of ions transported by the ion transport device. During the control process, the number of transported ions can be guided via the supplied energy volume. In one example, by alternating between the first and second status, switching of ion dosage apparatus can be realized. During the switching step, the number of transported ions is, in essence not the critical issue but rather the fact whether ions are transported and, possibly, whether the number of transported ions surpasses a specified threshold value. The ion dosage apparatus is arranged between the first and second electrode. In an example, the first electrode can be an anode and the second electrode a cathode and the ion transport device can be an electrolyte, also in connection with a separator.

The energy storage apparatus or the energy release apparatus comprises at least three connections, namely the first electrode, the second electrode and the energy supply device for activation and/or control of the ion dosage device and/or the therein contained separation device. The energy supplied to the ion dosage apparatus can essentially act upon the separation device without conversion into a different form of energy. For example, the supplied light energy acts directly upon the separation device. Similar to a field effect transistor, the conductivity of the material of the separation device is influenced by the supply of energy. The energy supply device can be regarded as guiding device for the ion flow transported between the electrodes. The ion transistor, in one example, may essentially act within a tension source or an energy storage device. For example, the ion conductivity of the material of the separation device is modified, in targeted fashion, by means of light energy or the energy of an electrical field. As a result, the invention-specific energy storage device can be designated as an ion transistor. The separation device can be designed as thin foil or as a layer system. The property of the foil or membrane for ion switching and ion dosing can be influenced by means of an electrical field. The ion dosage device can be used for dosing or switching of flows of ions. In one example, the ion conductivity of the foil or the membrane can be modulated through influence on an ion channel via an electrostatic field and in this manner altered. A field-modulated polymer ion channel may be particularly employable, which is created by the combination of monomers, for example alamethycin and gramidicin and which can be assembled, deformed or destroyed by an established electrostatic field, as a result of which it is possible to modulate the ion conductivity.

According to a further aspect of the present invention, a flying body comprises an energy storage apparatus with ion dosage apparatus.

Particularly for military applications, long-term storage capability is required. For example, long-term storage capability of batteries and accumulators installed in military aircraft is a requirement. Long-term storage capability of batteries can be achieved with so-called thermal batteries, which are electrically inactive until their deployment since the electrolyte, in particular the separator in the cell, will not become ionic conductive until activation of the battery, the cell or the accumulator occurs, resulting in establishing the ability of the battery to function. The ionic conductivity can be established by uncontrolled heating of the electrolyte, for example by pyrotechnical charge. A thermal battery merely commands a brief operating span on the order of a few minutes, inasmuch as an electrolyte which is activated by pyrotechnical heating, remains conductive for ions only for a limited period of time.

In addition, thermal batteries, compared with other battery-systems, for example li-ion cells (lithium ion cells) present relatively low specific energy density. Energy density, however, is a parameter that plays a central role in a multitude of applications. The need for energy of the individual consumers and also the number of consumers in a multitude of applications shows, for example, continued growth.

Furthermore, battery systems may be subject to safety problems, which are caused, for example, by high electric flows, and which, accordingly, produce high ionic flows in the interior of the battery. This may result in some battery configurations to damage of boundary layers and, as a result, produce dendrite formation and thermal damage to the cell.

With the aid of the separation device, an energy storage apparatus can be installed in the ion dosage apparatus, which, as required, can be activated, even after a long period of time. It can be regarded as an aspect of the present invention that the ionic conductivity of a separation device, a barrier layer or of a separator—for example a separator membrane—can be controlled, altered, guided or dosed by means of supplied energy. The ionic conductivity can—for example—be controlled dependent upon the supplied energy volume and the supplied form of energy,—for example—depending upon the radiation intensity, wavelength and length of radiation. The separation device or barrier layer can be installed in a separator device or separator membrane, which is present in an energy storage apparatus in order to separate active materials from each other, for example. Alternatively, the separator device can be employed as an additional barrier layer to the separator membrane of a battery or an accumulator. Thus, the ion dosage apparatus with its separating device can be regarded as a switchable separator or as a steerable separator. In particular, a corresponding ion dosage apparatus with the pertinent separation device can also be designated as switchable separator for a battery or for an accumulator.

The ion dosage apparatus, the switchable separator, the additional barrier layer of the ion dosage apparatus or the additional separator membrane may comprise a circuit of energy guiding devices, for example, a circuit of light guiding fibers. Each one of the employed energy guiding devices can show high loss in performance for the transport of the selected energy in transport direction, so that a major portion of the energy is given off in an area outside the energy guiding device. Because of the high loss in performance, a major portion of the transported energy, in essence, can be transferred by the energy guiding device to the separation device. The energy can be transported by an optical radiation, a microwave, any other optional electromagnetic radiation form, an electric flow, a magnetic field, an electric field, an electrostatic field, a magnetic field or also as thermal radiation. In an example, with introduction of radiation energy in the optical area, the transfer of energy from the energy guiding device to the separation device of the ion dosage apparatus takes place via the structures inserted in a gradient light guiding fiber, which lead to increased uncoupling of part of the radiation at the location at which the structures are located. In another example, with partial transparency of the light guiding fiber, the uncoupling of radiation occurs via losses with reflection of radiation in the interior of the light conductor. In still another example, uncoupling occurs via an electrical field.

The separation device or barrier layer can envelop the energy guiding device, so that the energy guiding device is essentially fully surrounded by the separation device. The openings created with loop-shaped placement or lattice-shaped placement of the energy guiding device can thus be essentially locked with the separation device. The combination of an energy guiding device and a separation device can form an ion dosage apparatus, which can be introduced into an energy storage apparatus. Any other three-dimensional form, in addition to the layer form, is also conceivable. An example for a separation device can be a photo-chemically decomposable polymer. This may react with the wavelength of a given laser radiation and be decomposed. In case of a photo-chemically decomposable polymer, a light guiding fiber or an optical conductor can be used as energy guiding device, in order to conduct the laser radiation through the separation device of the ion dosage apparatus. In further exemplary embodiments, other radiation forms are also conceivable, such as visible light, UV (ultra-violet-radiation) and IR (infra-red)-radiation, which can be guided with the corresponding conductors. The form of guidance can increase the effect of the photo-chemical reaction. In the event that the ion dosage apparatus is formed by a light guiding fiber and by a photo-chemically decomposable polymer, the light guiding fiber can be enveloped with the photo-chemically decomposable polymer, or with a polymer whose chemo-physical property is definably adjustable by means of specific radiation. The ion conductivity of such polymer can be designated as chemo-physical property of such Polymer. A polymer, whose chemo-physical property can be adjusted or dosed in targeted fashion or a photo-chemically decomposable polymer is an example for the separation device of an ion dosage apparatus, which alternates with a corresponding form of energy, which is conducted in the energy guiding device and exits from it.

Energy is supplied to the energy guiding device from an energy source. The combination of the material employed for the separation device and the energy source employed and thereby the utilized first energy guiding device and/or the second energy guiding device may be selected in case of optics in such manner that the photo energy of the employed laser radiation—for example—of an excimer laser, is greater than the bonding energy of the covalent bonding actions in the polymer of the separation device.

A hydroxy-substituted low alkyl-acrylate or -methy-acrylate can be used as a polymer, which is interlaced with ethyl-glycol-dimetha-acrylate, ethylen-glycol-dimetha-acrylate or divinyl-benzol. Moreover, an interlaced polymer can be employed with the following covalent principal bonding actions, for example, carbon-carbon, carbon-nitrogen, carbon-oxygen, silicone-carbon and/or silicone-oxygen. An inter-linked polymer, in essence, is a three-dimensional network.

The polymers are specifically selected in such manner that neither the employed polymers nor the decomposition products being generated react in such manner with the content substances or the components of the energy storage apparatus, that such reaction and/or the reaction products being generated, have a detrimental effect with respect to the functional capability of the energy storage, for example, impair the ion guiding capability.

The effectiveness of the radiation during decomposition may be increased if coherent radiation is employed.

In another example, the ion guiding capability of the separation device can be adjusted, in targeted manner, by an electromagnetic field, introduced by an energy supply device and an energy guiding device. As a result of the energy supply, the ion dosage apparatus may be used for switching and steering of ion flows. For the separation device, foils or other thin layer-systems may be employed. With supply of energy, these permit the flow of ions and they are chemically stable and/or inert vis-a-vis those substances, which come into contact with the separation device and which are a component of the energy storage apparatus.

By means of the described separation device, an energy storage apparatus can be protected against self-discharge and it is possible to increase the length of time until the energy is to be provided from the energy storage apparatus. Consequently, it is possible to increase the storage time or the time period of availability. As a result of the targeted guiding or targeted dosing of transported ions in the separation device, it may also be possible to alter an internal impedance of the energy storage apparatus, so that realization is possible of a controlled source of energy. It is possible, for example, to control or regulate the flowing electrical currents, in case of error, by dosing the ion flow inside the energy storage apparatus.

According to another aspect of the present invention, the ion dosage apparatus is set up as safety device for a potential case of error. In this scenario, in case of an error in the energy storage apparatus or in the energy storage apparatus, the flow of ions in the cell is interrupted and emission of energy by the energy storage apparatus is undercut, for example by blocking the flow of ions. Blocking of flow of ions can be done by on/off switching of the electrical energy. There is the possibility of interconnecting energy dosage apparatuses with the ion dosage device so that electronic performance objectives can be taken on by at least one or also a multitude of such energy storage apparatuses, for example rotation number regulation of engines or signal formation. The ion dosage apparatus can be designated as an electro-chemical or/and electro-optical transistor. In this design, this transistor essentially acts within the source of energy. The ion dosage apparatus may be a regulated impedance for a flow of ions.

According to another aspect of the present invention, the ion dosage apparatus is designed so that an iron flow within the cell becomes possible only for the duration of the energy contribution by the energy guiding device. In case of error in the energy storage system, the flow of ions is interrupted by stopping the external supply of energy.

The additional insertion of the separation device allows an increase in the storage capability of any battery of energy storage apparatus using ion transport for release of stored energy, a large band width of battery types—for example high energy li-ion batteries—can be altered in such manner that they can be employed in special long-term applications. It thus becomes possible to adapt various existing battery types, so that they can be employed in cases in which there is the requirement for excellent storage capability and rapid availability. For example, in comparison with thermal batteries, batteries having increased energy density can be employed for aircraft. Frequently it may suffice to only substitute the existing separator with a switchable separator—in other words, substitute the ion dosage apparatus, whereby in this particular instance the ion dosage apparatus may present the separator material of the existing separator, which, in essence, cannot be influenced by the first energy. In comparison with thermal batteries, batteries with increased energy densities can provide an extended operating time, within the framework of the respective application, or make possible use in this form of energy storage and/or corresponding consumers. In the case of aircraft, an improved specific energy density of employed energy storage units may lead to relevant weight reduction, which may result in diverse benefits with respect to the design of the system and which support good system design.

According to another aspect of the present invention, in the first state, in which no energy is supplied, the number of ions is transported and/or permitted to pass, and in the second state, in which the first energy is supplied, the ion transport is blocked.

Thus, a conductive state may be attained without supply of energy and with a supply of energy a blocked state.

According to a further aspect of the present invention, the number of transported ions is influenced by the aperture of at least one opening for ion transport in the first energy guiding device and/or by change of ion guiding capacity of the separation device within the ion dosage apparatus. Alternatively, at least one opening can be changed for a transport path in the ion dosage device in order to control the number of transported ions. For example, the opening of an ion channel might be changed.

At least the one opening or at least the one space between energy guiding devices arranged at a distance, for example the loops of a net, may form a transport path. The ion dosage apparatus, in its capacity as ion transport barrier is, in essence, capable to undercut all transport. It can divide, for example, an electrolyte into two areas, between which no exchange of ions is facilitated as long as the ion dosage apparatus or the separation device of the ion dosage apparatus is present and blocks the exchange of ions. By destroying the ion transport barrier, in other words by destroying the separation device, the ion dosage apparatus, with respect to at least one opening, can become permeable for the electrolyte and thus for the ions which are present in the electrolyte. Through the at least one opening, the electrolyte can then spread out. Maximum permeability may exist with complete destruction of the separation device, if, in essence, the ion dosage apparatus consists of only the first energy guiding device and the first energy supply device. By destruction of the ion transport barrier or the separation device, the transport path for ions or for an electrolyte can be released, including liberated ions.

In another example, the separation device itself may facilitate an exchange of ions between two areas, however, the number of ions to be exchanged may depend upon the parameters of the state of the material utilized for the separation device. The separation device is then an ion transport device whose ion conductivity can be controlled via energy introduced by means of the energy guiding device.

For the separation device, a material can be employed whose ion conductivity depends upon an existing and/or absorbed surrounding energy, for example from an existing optical radiation. In particular, the number of mobile ions in the material of the separation device may depend upon the volume of supplied energy. The separation device can be an electrolyte, whose ion transport capability depends upon the energy absorbed by it. The volume of the supplied energy may establish an ion flow density in the separation device. If an electrolyte is already present in an energy storage apparatus, whose ion conductivity can be influenced by an appropriate form of energy, it may suffice to merely introduce a structure which consists of the energy guiding device that is suitable for the electrolyte. It is, however, possible to function also without an additional barrier and to control only the separating properties of the electrolyte.

In an exemplary embodiment of the present invention, the separation device is designed as an ion transport barrier for blocking an ion transport.

Blocking of the ion transport essentially inhibits the ion transport process and may provide that there will be no or only very small self-discharge within an energy storage apparatus, in which the ion dosage apparatus with pertinent separation device is utilized.

According to another aspect of the invention, the first energy guiding device is designed as a circuit with at least one lattice-shaped, honeycomb-shaped and/or round opening. The circuit has at least one loop or at least one opening, which is created between parallel positioned segments of the fixed energy guiding device and which facilitates ion transport through the energy guiding device, or around it and/or past it. If openings are free, for example because a polymer, a barrier layer, or a separation device has been destroyed that locks these openings, an essentially unimpeded ion transport can take place. Here, an essentially unimpeded ion transport can mean that the dimensions of the openings or pores of the energy guiding device are chosen in such manner that from the circuit or structure formed by the first energy guiding device there takes place negligible impairment of ion transport. The ion transport is essentially determined by the separation device, for example by the ion conductivity of an electrolyte capable of being influenced, but also by the transport properties of the adjoining material. The ion dosage apparatus may be regarded as a controllable ion transport device.

According to a further aspect of the present invention, the first energy guiding device is surrounded by a barrier material or a separation device and forms with it the ion dosage apparatus. The barrier material can be destroyed by the transported first energy and result in dosing and/or facilitating an ion transport. The barrier material with energy guiding device forms an ion dosing device or an ion dosing layer, which can be influenced by means of supplied energy.

The destruction of the barrier material, for example the destruction of a photo-chemically decomposable polymer or of a polymer whose chemo-physical property can be adjusted by specific radiation, with the destruction taking place through absorption of energy that is released from the first energy guiding device. The release of energy from the first energy guiding device to the surrounding barrier material can be realized through high losses, which are comprised by the first energy guiding device. Another example deals with transport losses of energy and/or defined uncoupling of energy from the energy guiding device by means of an uncoupling device provided for the purpose. An uncoupling device, for example, is a structure within gradient light guiding fibers.

According to another aspect of the present invention, the first energy guiding device is a conductor, which is chosen from a group of conductors, with the group comprising an optical conductor, a thermal conductor, an electrical conductor and a conductor for an electromagnetic wave.

By using different energy guiding devices it is possible to utilize different forms of energy, for example optical energy, thermal energy, magnetic energy, electrical energy, electrostatic energy or electromagnetic energy, in order to produce an effect in the ion dosage apparatus and in particular in the barrier material. The effect can be the change of ion conductivity and/or destruction of the barrier material. An example of a conductor of optical energy is a light guiding fiber, examples of a conductor of thermal energy are a heating wire or a heat pipe, an example of a conductor for electrical energy is a wire and examples for a conductor of electromagnetic energy are a co-axial conductor or a waveguide.

According to another aspect of the present invention, the first energy guiding device presents high loss for energy transport. Alternatively, the energy guiding device shows a defined uncoupling rate for the guided energy. A defined uncoupling rate can, for example, be attained by structuring of gradient light guiding fibers. In particular, it is possible to adjust the defined uncoupling rate at a location which can be specified.

High loss can be generated for example by low quality of the first energy guiding device. For example, an optical conductor can be employed, which essentially emits radiation from the interior of the optical conductor into an exterior space. By different measures, it is also possible to adjust the position where emission of energy takes place. For example, it is possible to achieve using an optical conductor high energy conductivity within the conductor by means of a reflective envelopment or a reflective encasement, while loss of the optical conductor is higher at a target location. The energy emission state can, for example, also be realized by appropriate structuring of gradient light guiding fibers. These gradient light fibers show generally low losses, and the uncoupling locations can be defined by structuring which is to be introduced. This also makes possible local influencing of the barrier layer.

According to a still other aspect of the present invention, the separation device has a polymer. The polymer can be a photo-chemically decomposable polymer or a thermally decomposable polymer. Alternatively, the separation device comprises a material, whose ion conductivity can be altered by an electrical field generated by the first energy guiding device, in order to determine the number of ions transported by the separation device and/or of ions permitted to pass.

According to a still other aspect of the present invention, the ion dosage device comprises at least one second energy guiding device with at least one second energy supply device, whereby at least the second energy guiding device is arranged separately from the first one. At least the second energy guiding device is set up to specify the transport direction of the second energy in order to conduct the second energy to a position—which is to be specified—of the separation device, and to intensify and/or cancel out at the position the effect of the first energy upon the separation device of the ion dosage apparatus.

The description of the first energy guiding device can also apply to the second energy guiding device.

In general, the first energy guiding device and the second energy guiding device are designated as energy guiding devices. The description of the first energy supply device can likewise apply with respect to the second energy supply device. In one example, an intensifying effect can be generated in the separation device by additional use of the second energy guiding device, in that the same form of energy is conducted from the same or from a different form of energy source to the separation device of the ion dosage apparatus, both via the first energy guiding device as well as via the second energy guiding device.

The ion dosage apparatus, in particular the separation device, can control a flow of ions, in essence orthogonal to a transport direction of energy in the first energy guiding device and/or in the second energy guiding device. As a result, the flow of ions is controlled around the energy guiding device, past the energy guiding device or between the energy guiding device.

In another example, the effect of the first energy upon the separation device can be cancelled by means of the effect of the second energy. For example, a separation device, a barrier device or a blocking layer which was destroyed by optical energy, can be restored by supply of thermal energy.

A material for the separation device could also be used, which, depending upon the properties of the provided energy, changes its properties in defined manner, whereby a switching process with respect to ion conductivity becomes possible. In one example, a polymer could be either decomposed or interlinked, depending upon the wavelength of provided radiation. Interlinking, in this connection, may mean that the blocking action is restored.

According to still another aspect of the present invention, the energy storage apparatus includes an active material arranged at the first electrode and at the second electrode.

A material can be designated as active material in which the electro-chemical reactions run their course leading to the formation of charge carriers, i.e. the formation of electrons and ions. The electrons flow via an external conductor while the ions are transported in the electrolyte. The electrolyte, in fact, serves as ion conductor. The electrolyte can serve both as ion transport device and also as a separation device controlled by the energy supply from the energy guiding device, whereby an influence can be exercised on the movement of ions in the interior of the energy storage apparatus.

According to another aspect of the present invention, the ion-transport device includes a separator.

If an electrolyte is used as ion transport device, there is a separator between the oppositely polarized electrodes and it serves to prevent direct electrical contact between the electrodes and, simultaneously, assures the flow of ions. An electrolyte can also serve as separator. Alternatively, a membrane can be employed as separator. The ion conductivity of a separator determines the impedance for the flow of ions between the electrodes.

According to an exemplary embodiment of the present invention, the separator comprises a first ion conductivity and the separation device comprises a second ion conductivity, with the second ion conductivity, in case of destruction of the separation device of the ion dosage apparatus, being greater than the first ion conductivity. In such case, the openings, loops or pores of a circuit of energy guiding devices constitute no significant impedance against the ion flow. The impedance against the ion flow is then determined by the separator material.

According to still another aspect of the present invention, the energy storage device is designed as battery, as cylindrical cell, as prismatic cell and/or as coffee bag cell.

It should be noted that different aspects of the invention were described with reference to different objects. In particular, several aspects were described with reference to apparatus claims, while other aspects were described with reference to method claims. A person skilled in the art, however, can take from the preceding description and from the following description that, with the exception of when described differently, any combination of characteristics pertaining to any category of objects is additionally included, also each combination of characteristics referring to different objects.

In particular, combinations of characteristics of apparatus claims and characteristics of method claims are to be disclosed.

BRIEF DESCRIPTION OF FIGURES

In the following, further exemplary embodiments of the present invention are described with reference to Figures.

DETAILED DESCRIPTION OF EMBODIMENT EXAMPLES

The representations in the Figures are schematic and not to scale. In the following description of FIGS. 1 to 5, the same reference marks are used for identical elements or corresponding elements.

Figure 1:
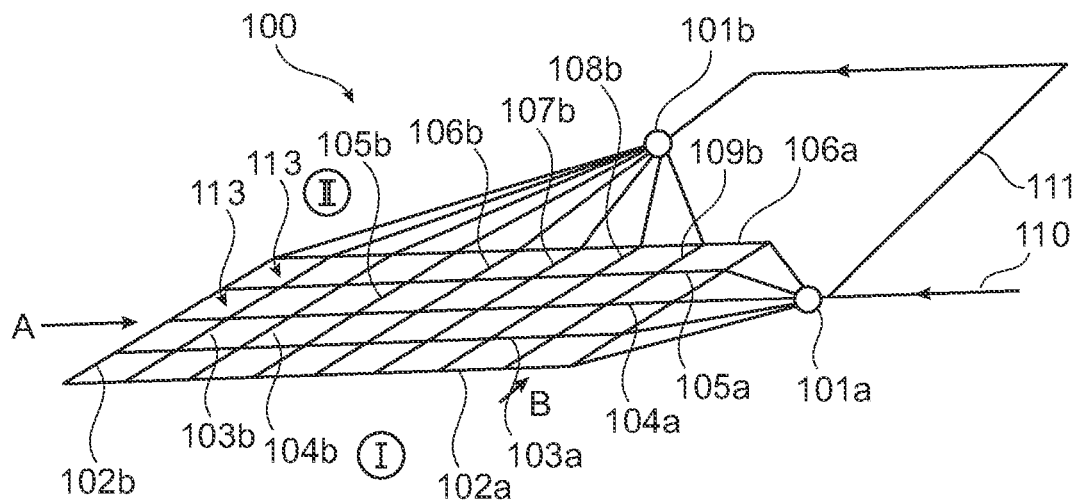
FIG. 1 depicts a perspective representation of an ion dosage device without separation device according to an exemplary embodiment of the present invention.

FIG. 1 depicts a perspective representation of an ion dosage apparatus without a separation device according to an exemplary embodiment of the present invention. In particular, FIG. 1 depicts a multitude of energy guiding devices. Energy guiding device $102a$, $103a$, $104a$, $105a$, $106a$, $102b$, $103b$, $104b$, $105b$, $106b$, $107b$, $108b$, $109b$ of the ion dosage apparatus 100 is depicted as a net of at least a first energy guiding device $102a$, $103a$, $104a$, $105a$, $106a$, and at least a second energy guiding device $102b$, $103b$, $104b$, $105b$, $106b$, $107b$, $108b$, $10b$. The energy dosage apparatus 100, however, can also have only one single first energy guiding device $104a$, which is surrounded by a separation device not represented in FIG. 1.

With loss of generality, the description in the following Figures will involve light conductors, optical conductors, or fibers as first energy guiding device $102a$, $103a$, $104a$, $105a$, $106a$, or as second energy guiding device $102b$, $103b$, $104b$, $105b$, $106b$, $107b$, $108b$, $109b$, which form a net of energy guiding devices for the ion dosage apparatus 100. The first energy guiding device $102a$, $103a$, $104a$, $105a$, $106a$, and the second energy guiding device $102b$, $103b$, $104b$, $105b$, $106b$, $107b$, $108b$, $109b$ are separated and arranged at a 90 degree angle to each other. This creates the rectangular openings 113, the rectangular loops 113, or the lattice-like openings 113 in the energy guiding devices or in the ion dosage apparatus 100. The first energy guiding device $102a$, $103a$, $104a$, $105a$, $106a$, and the second energy guiding device $102b$, $103b$, $104b$, $105b$, $106b$, $107b$, $108b$, $109b$ are supplied from the same source of energy. In the optical case described in FIG. 1, the source of energy is laser radiation 110, which transports optical energy. In another example, different energy guiding devices can also be fed from different energy sources. This can be the case, for example, if by means of energy source different properties are to be adjusted in the separation device.

The first energy 110 is coupled via the first energy supply device $101a$ and via the second energy supply device $101b$ into the first energy guiding device $102a$, $103a$, $104a$, $105a$, $106a$, or into the second energy guiding device $102b$, $103b$, $104b$, $105b$, $106b$, $107b$, $108b$, $109b$.

In FIG. 1 the first energy supply device $101a$ and the second energy supply device $101b$ is designed as beam splitter $101a$, $101b$ which supply with energy each of the multitude of first energy guiding devices $102a$, $103a$, $104a$, $105a$, $106a$, and the multitude of second energy guiding devices $102b$, $103b$, $104b$, $105b$, $106b$, $107b$, $108b$, $109b$ of the ion dosage apparatus 100. The first energy supply device $101a$ decouples, via stub line 111, the energy for the second energy guiding device $102b$, $103b$, $104b$, $105b$, $106b$, $107b$, $108b$, $109b$ from the first energy supply device $101a$. Alternatively, the network of an ion dosage apparatus 100 depicted in FIG. 1 can also be formed by a single first energy guiding device $102a$, which is positioned in loop-shape. The limited bending radii of light fibers must be taken into consideration when using light fibers.

Alternatively to supplying the same energy 110, in other words with laser radiation 110, different forms of energy can be used for the first energy guiding device $102a$, $103a$, $104a$, $105a$, $106a$, and for the second energy guiding device $102b$, $103b$, $104b$, $105b$, $106b$, $107b$, $108b$, $109b$ different forms of energy can be used, for example optical energy and thermal energy, if corresponding physical energy guiding devices are provided for the first energy guiding device 102a, 103a, 104a, 105a, 106a and for the second energy guiding device 102b, 103b, 104b, 105b, 106b, 107b, 108b, 109b, in other words for example optical conductors or thermal conductors.

For better visibility of energy guiding devices 102a, 103a, 104a, 105a, 106, 102b, 103b, 104b, 105b, 106b, 107b, 108b, 109b of the ion dosage apparatus 100, the separating device depicted in FIG. 1, is not shown, which is located in the openings 113 of the energy guiding devices of the ion dosage apparatus 100 and/or surrounding the multitude of the first energy guiding devices 102a, 103a, 104a, 105a, 106a and around the multitude of second energy guiding devices 102b, 103b, 104b, 105b, 106b, 107b, 108b, 109b. In case of destroyed separating device, the ion dosage device may be present in the form of individual energy guiding devices. The separating device or barrier layer in the openings 113 can be designed as polymer, which locks the openings 113 and thus forms an ion dosage apparatus 100 or ion dosing layer 100 together with the first energy guiding device 102a, 103a, 104a, 105a, 106a, and/or with the second energy guiding device 102b, 103b, 104b, 105b, 106b, 107b, 108b, 109b.

The first energy guiding device 102a, 103a, 104a, 105a, 106a, and/or the second energy guiding device 102b, 103b, 104b, 105b, 106b, 107b, 108b, 109b are thus embedded, for example in a photo-chemically decomposable polymer. By the supply with laser radiation 110, which is conducted via the first energy guiding device 102a, 103a, 104a, 105a, 106a, and/or the second energy guiding device 102b, 103b, 104b, 105b, 106b, 107b, 108b, 109b to the respective openings and thus also to the therein located separation devices, and in particular to the material of the barrier layer. Since the separation device is made of photo-chemically decomposable polymer, it is possible to destroy the photo-chemically polymer by application of laser radiation.

The combination of the first energy guiding device 102a, 103a, 104a, 105a, 106a, and second energy guiding device 102b, 103b, 104b, 105b, 106b, 107b, 108b, 109b with the separation device can also be designated as switchable separator 100 and employed as a battery. The switchable separator 100 can dose an ion flow around the energy guiding device—it can limit, change and, essentially even totally block the flow.

Figure 4:
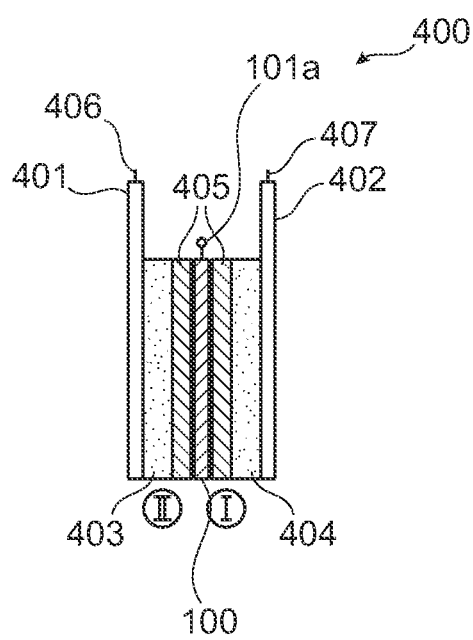
FIG. 4 depicts an energy storage apparatus according to an exemplary embodiment of the present invention.
Figure 5:
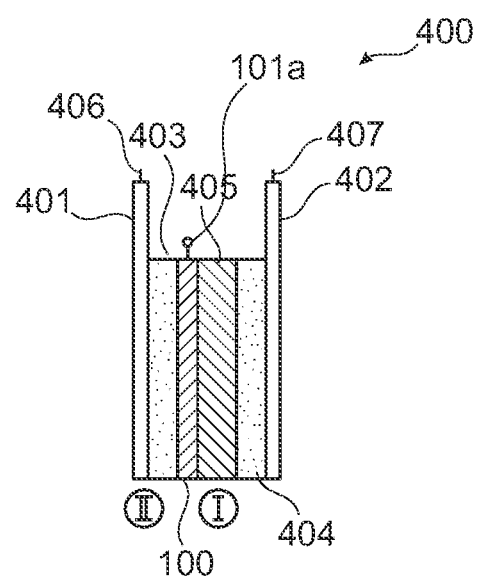
FIG. 5 depicts an energy storage apparatus with a different layer construction vis-a-vis FIG. 4, according to an exemplary embodiment of the present invention.

With respect to the switchable separator 100 or the ion dosage apparatus 100 we are dealing with a device with the aid of which storage capability of batteries can be increased. Examples for lay-outs of the ion dosage apparatus 100 in a battery 400 are depicted in FIG. 4 and FIG. 5. Separator 100 and in particular the separating device of the ion dosage apparatus 100 can reduce self-discharge in a battery 400. Self-discharge is frequently caused by unwelcome side reactions within the battery 400 or cell 400, in which there occurs ion transport via electrolyte 405 which is present in battery 400. The electrolyte is provided in the battery 400 as ion transport device 405. For reduction of self-discharge, the ion dosage apparatus 100 prevents transport of ions that would occur as a result of unwelcome side-reactions in that such ion transport is undercut during the storage time of the battery. This would correspond to a design of the ion dosage apparatus 100 or the energy storage apparatus 400 as an ion switch or "on"-switch, and upon availability of a preset energy volume, transport takes place of a preset number of ions. A further embodiment of the invention as ion dosage apparatus facilitates dosing of ion flow inside the cell, which can then be increased or reduced by increasing or lowering the supply of energy. Especially in case of errors, such flow regulation can be facilitated with respect to greater safety. The ion dosage apparatus 100 can essentially undercut the ion transport process inside battery 400 by the electrolyte during the time that the battery is stored. At the start-up, activation and utilization time of the energy storage apparatus 400 or battery 400, the ion transport barrier or separation device is adjusted in such manner that ion transport via ion dosage apparatus 100 and in particular via its separation device corresponds to a preset size or, essentially, is not impeded by the separation device. In one exemplary embodiment the barrier effect of the separation device is destroyed, so that ion transport essentially can occur through openings 113 or through gaps 113 between segments of the first energy guiding device, which is not interfered with by the ion dosage apparatus 100. In other words, due to cancellation of the separation effect of the separation device, operation of a battery is made possible as if the ion dosage apparatus 100 were not present in the battery. When using the battery for release of energy, the effect of the ion dosage apparatus 100 is essentially cancelled or is adjusted as desired.

Figure 2:
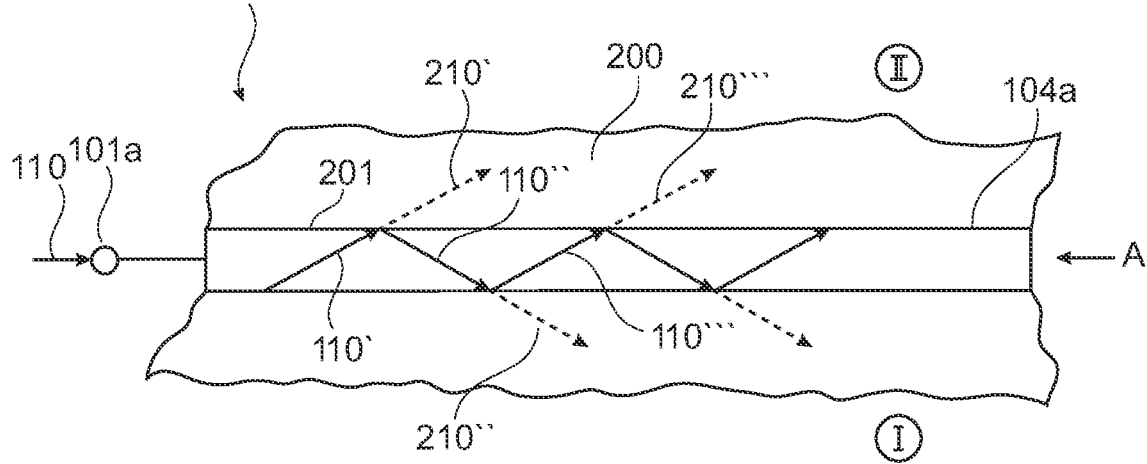
FIG. 2 depicts a longitudinal section of an ion dosage device according to an exemplary embodiment of the present invention.

FIG. 2 depicts a sectional representation through an ion dosage apparatus 100 according to an exemplary embodiment of the present invention. In this arrangement, FIG. 2 depicts the section through the first energy guiding device 104a of FIG. 1, which is surrounded by the separation device 200. In case of the ion separation device 200 we are dealing with a photo-chemically decomposable polymer, if supply of radiation is involved as form of energy. The first energy guiding device 104a, or the light fiber 104a, is fully surrounded by the separation device 200, in particular by the barrier layer material 200. The separation device 200 blocks in the present case of FIG. 2, the ion transport—in essence, in its entirety—between the areas I and II, around the first energy guiding device 104a, past it and/or through the gaps 113 between the segments of energy devices.

The sectional representation of FIG. 2 corresponds to a section along sectional line A of FIG. 1.

Starting from the side of the first energy supply device 101a, the first energy 110 is coupled into the first energy guiding device 104a. In the embodiment represented in FIG. 2, the first energy constitutes a laser radiation 110 and thus an optical energy 110. The optical energy 110 is conducted, through reflections to the boundary layer 201, along the first energy guiding device 104a, in the interior of the energy guiding device 104a, so that the laser radiation 110 spreads out in the interior of the energy guiding device 104 as beams 110', 110", 110'''. FIG. 2 likewise depicts that based on high loss portions of laser radiation, the energy loss in the form of radiation 210', 210", 210''' is decoupled from the first energy guiding device 104a into the separation device 200 or barrier layer 200. For targeted decoupling, a structure may be inserted in a light conductor, for example a structure in a gradient fiber, such as micro-prisms or micro-concaves with variable period. Due to insertion of structures, the incidence angle of radiation can decrease to the extent that it becomes smaller than the limiting angle for total reflection. Based on this constructive measure, decoupling of radiation can be achieved.

Because of the decoupling, the decoupled energy 210', 210", 210''' can interact with the separation device 200 and/or the photo-chemically decomposable polymer 200, as a result of which the separation device 200 is destroyed or some influence is exercised upon the ion conductivity of the separation device 200. In case of expansion of electromagnetic energy, the high exiting energy portion can be achieved by physical adaptation of a hollow conductor or of wave impedance in the cover surface of the hollow conductor.

The separation device 200 forms, together with the first energy guiding device 102a, 103a, 104a, 105a, 106a, a thin layer or a layer system, which, in addition to an electrolyte 405 present in battery 400, can be inserted between both electrodes of a battery. Electrolyte 405 can also comprise an additional separator and forms then an electrolyte/separator system 405. The separator, which is present in the electrolyte/separator system, is, in essence, responsible for the size of the ion flow, if the barrier effect of the separation device 200 has been cancelled. For example, the separator of the electrolyte/separator system may indicate low ion conductivity compared with the ion conductivity of the separation device 200. The separation layer 200 is inert vis-a-vis the materials employed in the battery 400,—in other words, this does not lead to side-reactions and to formation of reaction products, which may limit the functionality of the battery.

The separation device 200 has the property of changing its ion conductivity via an initial process, so that within a brief period of time the functionality of the battery can be restored. In this design, the interruption of the ion transport paths caused by the separation device is erased so that battery functionality can be restored within a short time. The initial process or the activation has the effect that the battery 400 behaves in such manner as if the ion dosage apparatus 100 did not exist. By means of a corresponding, but also via a different than the initializing process, it is possible to restore the barrier effect of the separation device 200.

Figure 3:
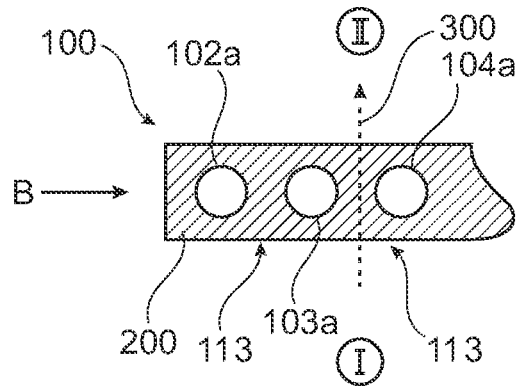
FIG. 3 depicts a cross-section through an ion dosage apparatus according to an exemplary embodiment of the present invention.

FIG. 3 depicts a cross-sectional cut of the ion dosage apparatus 100 according to an exemplary embodiment of the present invention. Depicted is a segment of the cross-section through the ion dosage apparatus 100 along the section line B of FIG. 1. The energy supply device 110 in FIG. 3 is not shown. FIG. 3 depicts how the first energy guiding device 102a, 103a, 104a of separation device 200 is surrounded by the polymer, for example, and forms the ion dosage apparatus 100. The gaps 113 between the first energy guiding devices 102a, 103a, 104a are locked in this arrangement by the separation device 200, so that there is essentially no possibility of ion transport between area I and area II, along the symbolically represented arrow 300, or in the opposite direction as well. Transport also at the energy guiding device 102a, 103a, 104a, 105a, 106a, 102b, 103b, 104b, 105b, 106b, 107b, 108b, 109b is blocked, either past or through the gaps 113. The separation device 200 thus blocks ion transport between are I and II and ion dosage device 100. The separation device 200 forms an ion transport barrier. Consequently, a thin layer 100 can be formed with the ion dosage apparatus 100, whose barrier effect is controllable. The ion dosage device 100 presents a photo-chemically decomposable polymer layer 200 as separation device or barrier layer 200. This polymer, by introduction of energy, for instance monochromatic radiation via laser, is very rapidly decomposed or impaired in such manner that the previously blocked ion transport paths 113 between the first energy guiding devices 102a, 103a, 104a, are cleared. Following release of the transport paths 113 or of the opening 113, an ion transport can take place between area I and area II. Discharge of the battery via an external power circuit thus becomes possible and battery 400 can be used. In this condition, battery 400 is activated. The reaction products of the photo-chemical decomposition, which are generated during the decomposition or which remain in the cell, shall have no negative impact on the behavior of the battery.

For contribution and distribution of energy 110 and/or radiation 110 within the barrier layer 200, a network of light fibers 102a, 103a, 104a, 105a, 106a, 102b, 103b, 104b, 105b, 106b, 107b, 108b, 109b is contributed to the layer 100. The employed fibers 102a, 103a, 104a, 105a, 106a, 102b, 103b, 104b, 105b, 106b, 107b, 108b, 109b indicate high losses with respect to the radiation transport, which means that a noticeable portion of the radiation 110', 110", 110'" is decoupled during the reflection processes at the fiber walls 201 through the fiber walls 201 and passed into polymer 200—or, however, the light fibers facilitate—for example by contributed structure, defined decoupling of part of the radiation. The decoupled energy interacts with the polymer 200 and initiates in the polymer 200 the desired photo-chemical reaction, for example the decomposition of the polymer 200 and/or the surrounding separation device 200. By supply of radiation 210', 210", 210'" to the separation device 200, the separator and/or the battery 400 is disconnected, so that transport of ions is made possible and the battery functions in essentially unrestricted fashion. The effect of the separation device 100 in the battery 400 is thus essentially cancelled. Eradication and restoration of the separation device facilitates realization of an ion switch. The ion switch is turned on when the separation device 200 has been eradicated and is turned off when the separation device 200 has been restored.

Alternatively, in another embodiment, the ion dosage device 100—i.e. the system polymer-light-fiber 100—can be selected in such manner that, depending upon employed wavelength of radiation 110, the properties of the embedding material, namely the material of the barrier layer 200, change in such manner that the barrier layer 200, i.e. in essence the covering material 200, is opened up for the transport of ions. When using another wavelength or when shutting off the radiation, the barrier layer can be restored, so that the openings 113 are closed again by regeneration of the embedding material 200. With the use of a material 200, which can be influenced in the manner via the wavelength, it is possible to turn off or turn on or dose the function of the battery.

In addition to the optical activation of the battery 400 by means of light guiding fibers 102a, 103a, 104a, 105a, 106a, 102b, 103b, 104b, 105b, 106b, 107b, 108b, 109b, thermal or also electrical eradication or restoration of blocking layer 100 is conceivable and in particular of separation layer 200. In another embodiment it is also provided that the first energy guiding device 102a, 103a, 104a, 105a, 106a, constitutes an optical energy guiding device for transport of optical energy and that the second energy guiding device 102b, 103b, 104b, 105b, 106b, 107b, 108b, 109b is designed for thermal energy transport, for example via heating wires 102b, 103b, 104b, 105b, 106b, 107b, 108b, 109b. Thus, for example, a barrier layer 200 and in particular the separation device 200 could be opened or eradicated by the supply of optical energy via the first energy guiding device 102a, 103a, 104a, 105a, 106a and then subsequently closed again by supply of second energy via the second energy guiding device 102b, 103b, 104b, 105b, 106b, 107b, 108b, 109b, or by an additional implanted network via thermal influence on the material 200 and/or the separation device 200, thus restoring the barrier effect.

FIG. 4 depicts a first energy storage apparatus according to an exemplary embodiment of the present invention. The energy storage apparatus 400, the battery 400 or the accumulator 400 comprise a first electrode 401 or anode 401 and a second electrode 402 or cathode 402. A first active material 403 is arranged at the anode 401 and a second active material 404 at the second electrode. The active materials 403, 404 serve for the release of ions and for generating electrical charges during the electro-chemical reactions that are running their course in the active material. The electrical charges can be discharged via electrode connections 406, 407 or via electricity discharge units 406, 407. The energy storage apparatus 400 has three connections, namely electrode connections 407, 407 for dissipation of energy stored in the energy storage apparatus 400 and the activation connection 101a, or the energy supply device 101a for activation of the energy storage apparatus 400. Dissipation of stored energy can only occur following activation of electrode connections 406, 407. With activation, the battery is turned off or turned on via the ion dosage apparatus 100. By means of an electrical connection between anode 401 and cathode 402, which is not represented in FIG. 4, it is possible to establish an electrical circuit in an exterior area of battery 400, and which is fed by the battery 400. The electrolyte 405 takes care of the ion transport inside battery 400. The electrolyte 405 can also comprise a separator, with is co-responsible for the size of the ion flow and which forms an electrolyte/separator system 405 with the electrolyte. In the case represented in FIG. 4, however, the separation device 200 has been implanted in the electrolytes 405, with the separation device 200 separating the two areas I and II within the battery, preventing the flow of ions. FIG. 4 thus depicts a battery in storage-ready condition, which makes possible long-term storage. The separation device 200 or barrier device 200 as part of the ion dosage device 100 prevents the exchange of ions.

FIG. 5 depicts an alternative layer construction of a battery 400, and in this construction the ion dosage apparatus 100 with separation device 200 is arranged between the electrolyte 405 and the first active material 403. In this alternative placement of barrier layer 100 as well, barrier layer 100 essentially fully undercuts any transport of ions between the two areas I and II. Alternatively, the ion dosage apparatus 100, which is present in barrier layer 100, can be set up in such manner that the transport of ions will not be totally undercut, but is only controlled by the volume of the provided energy.

By way of supplementary comments it should be noted that the terms "comprehensive" and "comprising" do not exclude other elements or steps and that the term "one" does not exclude a multitude. In addition it should be pointed out that characteristics or steps which were described with reference to one of the above embodiment examples, may also be employed in combination with other characteristics or steps of other earlier described embodiment examples. Reference symbols in the claims are not to be considered as a limiting factor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An ion dosage apparatus for an energy storage apparatus, comprising:
   a first energy guiding device having a first energy supply device configured to supply a first energy to the first energy guiding device; and
   a separation device,
   wherein in a first state in which no energy is supplied via the first energy supply device, the separation device is configured to block ions from being transported past the first energy guiding device;
   wherein the first energy guiding device is configured to specify a transport direction of the first energy to guide the first energy to a preset position of the separation device and to emit the first energy to the separation device at the preset position,
   wherein in a second state in which the first energy is supplied via the first energy supply device, the separation device is configured to control a volume of emitted first energy, a number of ions transported by the separation device past the first energy guiding device, or a number of ions permitted to pass by the separation device.

2. The ion dosage apparatus of claim 1, wherein in the first state in which no energy is supplied the number of ions is transported or permitted to pass, and in the second state in which the first energy is supplied the transport of the ions is blocked.

3. The ion dosage apparatus of claim 1, wherein the number of transported ions is influenced via at least one aperture of an opening for a transport path in the first energy guiding direction, or by modification of ion conductivity of the separation device.

4. The ion dosage apparatus of claim 1, wherein the first energy guiding device is a network with at least one lattice-like, honeycomb-shaped, or round opening.

5. The ion dosage apparatus of claim 1, wherein the first energy guiding device is surrounded by the separation device, and wherein the separation device is configured so that the transported first energy eradicates the separation device.

6. The ion dosage apparatus of claim 1, wherein the first energy guiding device is an optical conductor, a thermal conductor, an electrical conductor, or a conductor for an electromagnetic wave.

7. The ion dosage apparatus of claim 1, wherein the first energy guiding device presents high loss for transport of energy or a defined decoupling rate of the transported energy.

8. The ion dosage apparatus of claim 1, wherein the separation device includes a polymer or wherein the separation device includes a material having an ion conductivity modifiable by an electrical field generated by the first energy guiding device, in order to control the number of ions transported or permitted to pass by the separating device.

9. The ion dosage apparatus of claim 1, further comprising:
   a second energy guiding device with a second energy supply device,
   wherein the second energy guiding device is arranged separated from the first energy guiding device, and
   wherein the second energy guiding device is configured to control a transport direction of second energy in order to guide the second energy to a second preset position of the separation device and to intensify or cancel out at the second preset position the effect of the first energy upon the separating device.

10. A method for producing an ion dosage apparatus for an energy storage apparatus, comprising:
    providing a first energy guiding device and a first energy supply device, wherein the first energy supply device is configured to supply a first energy to the first energy guiding device;
    encapsulating the first energy guiding device with a separation device;
    wherein in a first state in which no energy is delivered via the first energy supply device the separation device blocks ions from being transported past the first energy guiding device;
    wherein the first energy guiding device presets the transport direction of the first energy in order to conduct the first energy to an preset position of the separating device and to emit the first energy to the separating device at the preset position, and
    wherein in a second state in which the first energy is delivered via the first energy supply line, the separation device controls a number of ions transported by the separation device past the first energy guiding device, or the number of ions permitted to pass by the separation device.

11. An energy storage apparatus, comprising:
a first electrode;
a second electrode;
an ion transport device;
an ion dosage apparatus, comprising
- a first energy guiding device having a first energy supply device configured to supply a first energy to the first energy guiding device; and
- a separation device,
- wherein in a first state in which no energy is supplied via the first energy supply device, the separation device is configured to block ions from being transported past the first energy guiding device;
- wherein the first energy guiding device is configured to specify a transport direction of the first energy to guide the first energy to a preset position of the separation device and to emit the first energy to the separation device at the preset position,
- wherein in a second state in which the first energy is supplied via the first energy supply device, the separation device is configured to control a volume of emitted first energy, a number of ions transported by the separation device past the first energy guiding device, or a number of ions permitted to pass by the separation device,
- wherein the ion dosage apparatus is in contact with the ion transport device in order to control a number of ions transported or blocked by the ion transport device,
- wherein the ion dosage apparatus is arranged between the first electrode and the second electrode.

12. The energy storage apparatus of claim 11, further comprising:
an active material arranged at the first electrode and the second electrode.

13. The energy storage apparatus of claim 11, wherein the ion transport device comprises a separator.

14. The energy storage apparatus of claim 13, wherein the separator comprises a first ion conductivity, the ion dosage apparatus comprises a second ion conductivity, and the second ion conductivity is greater than the first ion conductivity.

15. The energy storage apparatus of claim 11, wherein the energy storage apparatus is a battery, a cylindrical cell, a prismatic cell, or a coffee bag cell.

* * * * *